Aug. 26, 1958     D. B. HOFFMAN     2,848,892

ELEVATOR LOAD TRANSDUCER

Filed Oct. 21, 1954

INVENTOR.
DONALD BERNARD HOFFMAN

BY

ATTORNEYS

United States Patent Office 2,848,892
Patented Aug. 26, 1958

2,848,892

ELEVATOR LOAD TRANSDUCER

Donald Bernard Hoffman, Hatboro, Pa.

Application October 21, 1954, Serial No. 463,834

4 Claims. (Cl. 73—141)

(Granted under Title 35, U. S. Code (1952), sec. 266)

The invention described herein may be manufactured and used by or for the Government of the United States of America for governmental purposes without the payment of any royalties thereon or therefor.

This invention relates to load measuring apparatus, more particularly, it relates to load measuring apparatus incorporating a Wheatstone bridge strain gage assembly.

The device of the present invention is particularly adapted to the measurement of loads on the push rod linkages of aircraft and guided missiles, however, it may be used in various other applications for the measurement of tensile and compressive loads. In designing the control systems of aircraft and guided missiles a major problem is the determination of the load to which the control system will be subjected so that corresponding air-loads on the airframe can be determined. While this can be calculated theoretically, a precise measuring technique is necessary for checking the theoretical results and for ascertaining load values under actual operating conditions.

In the past, load measurement on control surfaces of airplanes has been made with devices utilizing strain gages placed on a portion of the control surface of the airplane itself. This type measurement is not sensitive enough for telemetering operations conducted with guided missiles, and so far as the measurement of loads on airplane control surfaces is concerned, the procedure has the disadvantage that its application requires separate installations on each airplane. The installation is also quite cumbersome.

Further, the sensitivity of known devices used is not of the order required for telemetering. Multiple gages were used in prior devices to minimize unwanted stress concentrations resulting from the non-homogeneous nature of the diaphragm materials.

It is, therefore, an object of this invention to provide load measuring apparatus having an order of sensitivity suitable for telemetering.

It is another object of this invention to provide load measuring apparatus of a type incorporating strain gages as the resistance arms of a Wheatstone bridge, which has a high frequency response and which provides for cancellation of unwanted bending and torsional strains.

It is another object of this invention to provide a device for measuring loads on aircraft control systems which measures both positive and negative loads, which is of rugged construction, and which is simple in installation.

It has been found that the above and other objects are accomplished by an elevator load transducer adapted for insertion in aircraft elevator control rods which comprises a diaphragm sensitive to small changes in load which has strain gages mounted on one of its surfaces at alternate areas of tension and compression. The diaphragm is sealed in an enclosure bounded by the surface upon which the strain gages are located and the inner surface of a load transferring cap upon which the load to be measured is received. The outside of the diaphragm is provided with a stud adapted to receive force from a push rod in the elevator control system of an aircraft. The pressure cap is also provided with a stud for transmitting force. The strain sensitive elements, or gages, are securely bonded to the surface of the diaphragm so that they reflect all strains to which the diaphragm is subjected. They are connected as resistances in the arms of a Wheatstone bridge so that changes in the resistance of the elements are reflected as output of the Wheatstone bridge.

The invention is best understood by reference to the drawings, hereby made a part of this application, and the accompanying description.

Figure 1:
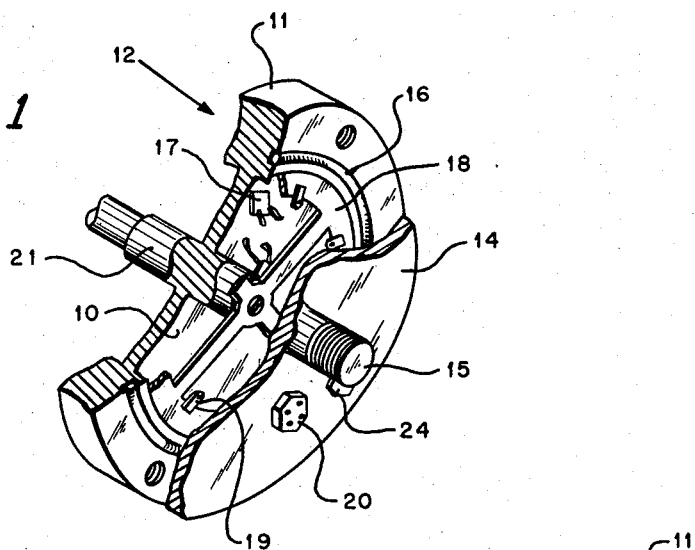
Fig. 1 is an isometric view partially in section of the elevator load transducer of the invention.
Figure 3:
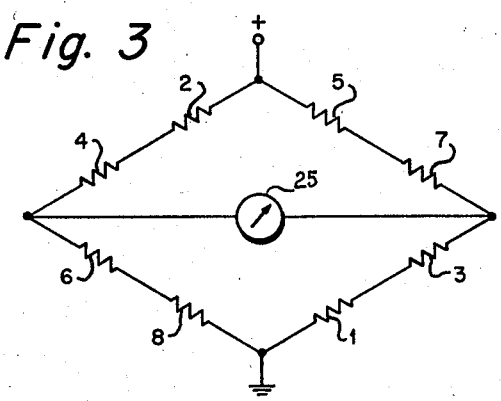
Fig. 3 is a schematic representation of the Wheatstone bridge arrangement used to reflect changes in resistance in the strain gage elements.
Figure 2:
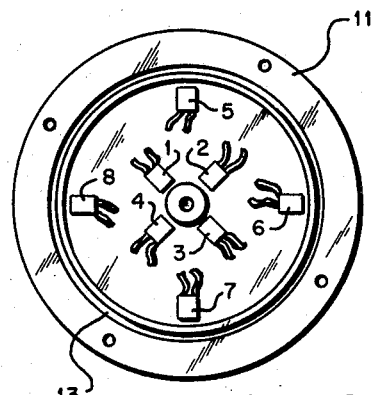
Fig. 2 is a plan view of the surface of the diaphragm to which strain gages are bonded, and shows the manner of positioning the strain gages on the diaphragm at alternate areas of tension and compression.

Referring to Fig. 1, a circular diaphragm 10 of aluminum is made integral with a thicker rim 11 to form the sensing element 12. The diaphragm 10 is provided with integral stud 21. The rim 11 is provided with a groove 13, best shown in Fig. 2, on its inner edge. A load transferring cap is shown at 14 attached to the inner surface of the rim 11 by bolts 24, so that a cavity is formed between its inner surface and the inner surface of the diaphragm 10. For attachment to a load, the cap 14 is provided with threaded stud 15 made integral therewith. An O ring 16 is seated in groove 13 between the inner edge of rim 12 and the inner surface of load transferring cap 14 to form a sealed enclosure. The strain sensitive elements 1 to 8 are bonded to the surface of the diaphragm element 10 in the positions shown in Fig. 2. These strain sensitive elements are securely bonded by means of a thermosetting resin so that they conform to delicate movements of the diaphragm. They are standard commercial strain gages. A circular phenolic resin strip 18 is mounted on integral stud 21 between the inner surface of the sensing element and the inner surface of load transferring cap 14 for the purpose of supporting electrical lugs 19 which form intermediate connections between the strain gages and the electrical outlet plug 20 in load tranferring cap 14. In this modification, eight strain gages, numbered 1–8, are used, however, the invention is not limited to any particular number of gages. Fig. 3 shows the arrangement, incorporating a meter 25 to which the strain gages are connected as resistances in a Wheatstone bridge.

Figure 4:
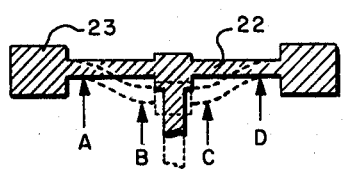
Fig. 4 is an illustrative showing of a sectional view of a beam (diaphragm) in its unstressed condition.
Figure 5:
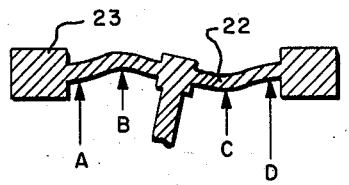
Fig. 5 is an illustrative showing of a sectional view of the beam of Fig. 4 (diaphragm) in an eccentrically loaded position.

The principle upon which the location of the strain gages on the inner surface of the diaphragm 10 is determined, is illustrated by reference to Figs. 4 and 5. In Fig. 4, the numeral 22 designates a beam made integral with its supporting rim 23 to form a structure analogous to that of the sensing element 12. The beam is loaded at the central island for stressing, as shown. The dotted lines indicate a stressed position of the beam 22. When the beam is deflected into the position indicated by the dotted lines, tensile strains occur at (B) and (C) and compressive strains occur at (A) and (D). Theory shows that these areas give the most accurate reflection of applied load. The strain gages are precisely located on the inner surface of sensing diaphragm 10 at these alternate areas of tension and compression to utilize the above phenomenon. As axial loading is applied progressively to beam 22, strain at (A), (B), (C), and (D) is increased in direct proportion to the load. The arrangement has the advantage not only of reflection of the most minute strain values, but it also ensures cancellation of unwanted strains due to eccentricities in loading, such as those resulting for torsion and bending. For example, in Fig. 5, a showing of the beam 22 in an eccentrically stressed position, compressive strains at (A) in Fig. 4 become tensile strains at (A), in Fig. 5 and tensile strains at (B) in Fig. 4 become compressive strains at (B), in Fig. 5. Suitable positioning of the strain gages at (A) and (B) will produce zero output on the strain gage bridge for this eccentric loading to cancel out unwanted strains due to eccentricities such as torsion and bending.

With the exception of the phenolic diaphragm and plug, the parts of the device are constructed of aluminum. Other suitable materials may be used. While the invention has been illustrated by a specific construction, equivalent constructions are obviously within the scope of the invention.

In operation, the transducer is inserted as a link in an aircraft elevator control push-rod by means of studs 15 and 21. Minute changes in pressure on the elevator surface results in a corresponding deflection of the diaphragm 10 to alter the resistance of the strain sensitive elements 17 and this change is reflected in the output of the Wheatstone bridge. For guided missile applications, the output is fed into an electronic system and from there to the telemetering station on the ground by conventional circuitry. For applications in piloted aircraft the output may be fed into an indicator in the airplane. The device has been extensively tested in determining loads on elevator surfaces of guided missiles and has been found to possess a sensitivity well above that required for telemetering purposes.

The high sensitivity of the device of the invention stems from the following structural features: The integral structure of diaphragm and rim eliminates errors of prior art arrangements in which the diaphragm is clamped at its edges. The feature of enclosing the sensing element in an airtight enclosure makes the device comparatively insensitive to humidity. Having all resistances on the same metal surfaces provides temperature compensation in the bridge. The precise positioning of the strain gages at alternate areas of tension and compression effects a reflection of the most minute strains in the diaphragm and cancels out unwanted strains resulting from eccentricities in loading, such as, torsion and bending.

It is thus seen that the invention provides load measuring apparatus which possesses a sensitivity suitable for telemetering, gives full temperature compensation of the Wheatstone bridge, provides for cancellation of bending and torsional strains, has an exceptionally high frequency response, and is not subject to minimum stress deviations resulting from any non-homogeneous nature of diaphragm materials.

While the load measuring apparatus of the invention has been illustrated by the modification of an elevator load transducer and its application to measure load on control surfaces of airborne devices, it is by no means limited to this application, as it may be used in an unlimited number of applications for measuring both tensile and compressive strains.

Obviously, many modifications and variations of the present invention are possible in the light of the above teachings. It is, therefore, to be understood that within the scope of the appended claims the invention may be practiced otherwise than as specifically described.

What is claimed is:

1. Load measuring apparatus, comprising: a relatively thin, resilient diaphragm element; means for securing said diaphragm element by its edges for measuring strain; means integral with said element for applying loads to said element; a plurality of individual strain sensitive gages forming at least two circumferentially arranged rows about the center of said element, said rows located at alternate areas of tension and compression on one surface of said diaphragm element, said gages securely bonded to said element; means sealing said one surface of said diaphragm element with its edges and said gages bonded thereto within an airtight enclosure; and means responsive to strains in said strain sensitive gages for measuring said strains and thereby said loads.

2. The apparatus of claim 1 in which the strain sensitive gages form the resistance arms of a Wheatstone bridge.

3. Strain measuring apparatus, comprising: a relatively thin, resilient metallic diaphragm having inner and outer faces thereof; a rim integral with the peripheral edge of said diaphragm having a thickness substantially greater than the thickness of said diaphragm so that said rim forms a shoulder on at least the inner face of said diaphragm, the face of the inner shoulder of said rim having a circumferential channel therein; means integral with the outer face of said diaphragm for transferring load directly to said diaphragm; a plurality of strain sensitive elements positioned at alternate areas of tension and compression on the inner face of said diaphragm and forming the resistances of a Wheatstone bridge; an element of dielectric material for supporting electrical leads mounted inwardly of said diaphragm and adjacent thereto; a load transferring cap fitted on the inner shoulder of said rim; rod means on said load transferring cap for receiving applied load; sealing means in said channel between said inner shoulder and said load transferring cap, whereby a sealed enclosure containing the strain sensitive elements is formed by the inner face of the diaphragm and the inner surface of said load transferring cap.

4. A load sensitive element comprising a resilient disc having an inner and outer face and provided with a relatively thick rim, a first rod member attached to the thin, central portion of the outer face of said disc and extending therefrom, a plate member extending across said rim covering the thin, central portion of said disc on the inner face thereof, a second rod member attached to said plate member and extending outwardly from said disc, and strain sensitive gages placed along the inner surface of said disc at alternate areas of tension and compression covered by said plate for measuring deformation of said disc caused by the application of loads to said disc by said rod members.

References Cited in the file of this patent

UNITED STATES PATENTS

| | | |
|---|---|---|
| 2,336,500 | Osterberg | Dec. 14, 1943 |
| 2,400,467 | Ruge | May 14, 1946 |
| 2,580,407 | Clark | Jan. 1, 1952 |
| 2,741,120 | Ormsby | Apr. 10, 1956 |